(12) United States Patent
Tomita

(10) Patent No.: US 10,619,692 B2
(45) Date of Patent: Apr. 14, 2020

(54) DAMPER

(71) Applicant: NIFCO INC., Yokosuka-shi, Kanagawa (JP)

(72) Inventor: Shigemitsu Tomita, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 0 days.

(21) Appl. No.: 15/573,703

(22) PCT Filed: May 11, 2016

(86) PCT No.: PCT/JP2016/064054
§ 371 (c)(1),
(2) Date: Nov. 13, 2017

(87) PCT Pub. No.: WO2016/185983
PCT Pub. Date: Nov. 24, 2016

(65) Prior Publication Data
US 2018/0149228 A1 May 31, 2018

(30) Foreign Application Priority Data

May 15, 2015 (JP) ................................. 2015-100391

(51) Int. Cl.
*E05F 3/02* (2006.01)
*F16F 9/02* (2006.01)
(Continued)

(52) U.S. Cl.
CPC .................. *F16F 7/09* (2013.01); *F16F 9/02* (2013.01); *F16F 9/0281* (2013.01); *F16F 9/32* (2013.01);
(Continued)

(58) Field of Classification Search
CPC ...... F16F 9/0218; F16F 9/0227; F16F 9/0281; F16F 9/02; F16F 9/3214; F16F 9/516;
(Continued)

(56) References Cited

U.S. PATENT DOCUMENTS 3,083,032 A * 3/1963 Cuskie ..................... B60G 3/18
280/124.152
5,029,919 A * 7/1991 Bauer ..................... B60R 19/32
188/287

(Continued)

FOREIGN PATENT DOCUMENTS

EP 841451 A2 * 5/1998
EP 1562721 B1 5/2006
(Continued)

OTHER PUBLICATIONS

PCT/ISA/210, "International Search Report for International Application No. PCT/JP2016/064054," dated Jun. 7, 2016.
(Continued)

*Primary Examiner* — Bradley T King
*Assistant Examiner* — Stephen M Bowes
(74) *Attorney, Agent, or Firm* — Manabu Kanesaka

(57) ABSTRACT

A damper includes a piston provided with a rod, and a cylinder storing the piston, and generates a braking force by a movement or relative movement of the piston. The cylinder is provided with width-side wall portions and thickness-side wall portions, and a shape in a cross section of the cylinder in a direction orthogonal to a moving direction of the piston is flat. The cylinder has a connection portion on an open side thereof, and the connection portion bridges the width-side wall portions.

11 Claims, 11 Drawing Sheets

(51) Int. Cl.
- F16F 7/09 (2006.01)
- F16F 9/32 (2006.01)
- F16J 10/04 (2006.01)
- F16F 9/34 (2006.01)
- F16F 9/36 (2006.01)
- F16F 9/512 (2006.01)

(52) U.S. Cl.
CPC ............ F16F 9/34 (2013.01); F16F 9/362 (2013.01); F16F 9/5126 (2013.01); F16J 10/04 (2013.01)

(58) Field of Classification Search
CPC .......... F16F 9/368; F16F 2236/06; F16F 9/58; F16F 9/3221; F16F 2226/04; F16F 2226/045; F16F 7/08; F16F 9/3235; F16F 9/19; E05F 3/02; B61B 10/04; B65G 35/06

See application file for complete search history.

(56) References Cited

U.S. PATENT DOCUMENTS

| | | | |
|---|---|---|---|
| 5,373,952 A | 12/1994 | Sugiura | |
| 8,640,837 B2 * | 2/2014 | Peuker | F16F 7/09 |
| | | | 188/381 |
| 2008/0135363 A1 * | 6/2008 | Tokumoto | F16F 9/3214 |
| | | | 188/322.18 |
| 2010/0109215 A1 * | 5/2010 | Ruthinowski | B60N 2/2809 |
| | | | 267/140.13 |
| 2012/0006928 A1 * | 1/2012 | Ono | B60R 22/4676 |
| | | | 242/374 |

FOREIGN PATENT DOCUMENTS

| | | | | |
|---|---|---|---|---|
| EP | 1662168 A1 * | 5/2006 | ............ | F16F 9/0218 |
| JP | S62-194940 U | 12/1987 | | |
| JP | H02-19939 U | 2/1990 | | |
| JP | H05-044740 U | 6/1993 | | |
| JP | H09-303320 A | 11/1997 | | |
| JP | 2000-88028 A | 3/2000 | | |
| JP | 2012-237407 A | 12/2012 | | |
| JP | 2015-230017 A | 12/2015 | | |
| JP | 2016-011750 A | 1/2016 | | |
| WO | 2007/024037 A1 | 3/2007 | | |
| WO | 2015/093548 A1 | 6/2015 | | |

OTHER PUBLICATIONS

Europe Patent Office, "Search Report for European Patent Application No. 16796376.8," dated Mar. 15, 2019.

China Patent Office, "Office Action for Chinese Patent Application No. 201811565805.5," dated Jan. 6, 2020.

* cited by examiner

DAMPER

FIELD OF TECHNOLOGY

The present invention relates to an improvement of a damper generating a braking force by an operation of a piston.

BACKGROUND ART

In an air damper device comprising a columnar rod member wherein a rod inner end is a piston portion, and a cylindrical cylinder member reciprocally storing the rod member, there is an air damper wherein a rod member includes a groove portion penetrating the rod member in a diameter direction thereof, and a pin member passing through the groove portion is provided on an open end side of the cylinder member so as to prevent falling off the rod member from the cylinder member (see Patent Document 1, FIG. 7, and FIG. 8).

In the air damper in the Patent Document 1, in the pin member, both ends thereof are pressed against a through-hole provided in the cylinder member and assembled with the cylinder member, and the pin member does not have a function more than preventing falling off of the rod member.

PRIOR ART DOCUMENT

Patent Document

Patent Document 1: Japanese Unexamined Patent Application Publication No. 2012-237407

SUMMARY OF THE INVENTION

Problems to be Solved by the Invention

A main object of the present invention is to provide this type of damper which can appropriately reduce a thickness.

Means for Solving the Problems

In order to obtain the aforementioned object, in the present invention, a damper comprises a piston provided with a rod; and a cylinder for storing the piston, and generates a braking force by a movement or relative movement of the piston. The aforementioned cylinder comprises width-side wall portions and thickness-side wall portions, and has a shape in a cross section of the cylinder in a direction orthogonal to a moving direction of the piston is flat, and the cylinder includes a connection portion bridging the width-side wall portions on an open side thereof.

According to such a structure, at first, rigidity on an open side of the cylinder can improve as much as possible, and secondly, a distance between a pair of the width-side wall portions can be maintained constantly in such a way that the damper always exhibits an intended performance. Furthermore, a deformation of the cylinder due to an environmental change such as an external force, a temperature change, and the like can be prevented.

In one of preferred aspects of the present invention, the rod comprises a long hole that allows the connection portion to pass through along the aforementioned moving direction. Such long hole can prevent the piston from coming off from the cylinder, and a movement on a piston side can be smoothly carried out.

In that case, furthermore, in one of the preferred aspects of the present invention, one end of the long hole is formed with the piston. In such a case, a movement distance of the piston inside the cylinder can be maximized.

Also, in one of the preferred aspects of the present invention, in the connection portion, a position approximately in a middle in a width direction of one of the width-side wall portions and a position approximately in a middle in a width direction of the other of the width-side wall portions are connected.

Also, two connection portions may be provided so as to sandwich the rod by the two connection portions. In such a case, by such two connection portions, at first, the rigidity on the open side of the cylinder can be improved further, secondly, the distance between the pair of the width-side wall portions can be constantly maintained more firmly in such a way that the damper always exhibits the intended performance, furthermore, the deformation of the cylinder due to the environmental change such as the external force, the temperature change, and the like can be prevented, and thirdly, the connection portions can maintain a combined state between the cylinder and the piston side, and can guide the movement on the piston side.

The connection portion may be formed by a pin member passing through a through-hole provided in the width-side wall portion, and formed with a press-fitting portion at an end portion.

Also, the connection portion may be formed by one portion of the width-side wall portion sectioned by a division groove provided in one of the width-side wall portions, and may be formed by a movable piece provided with a bendable thin base portion and a free end which can engage an engaged portion formed in the other of the width-side wall portions.

Also, the cylinder may be formed by combining a first portion including one of the width-side wall portions and a second portion including the other of the width-side wall portions, and may form projection portions which become the connection portion by respectively abutting against the first portion and the second portion by the aforementioned combination as well.

Effect of the Invention

According to the present invention, by the connection portion, the rigidity on the open side of the cylinder, and the distance between the pair of the width-side wall portions can be maintained constantly, and furthermore, the deformation of the cylinder due to the environmental change such as the external force, the temperature change, and the like can be prevented, thereby, a thickness of the damper can be appropriately reduced.

BEST MODES OF CARRYING OUT THE INVENTION

Figure 1:
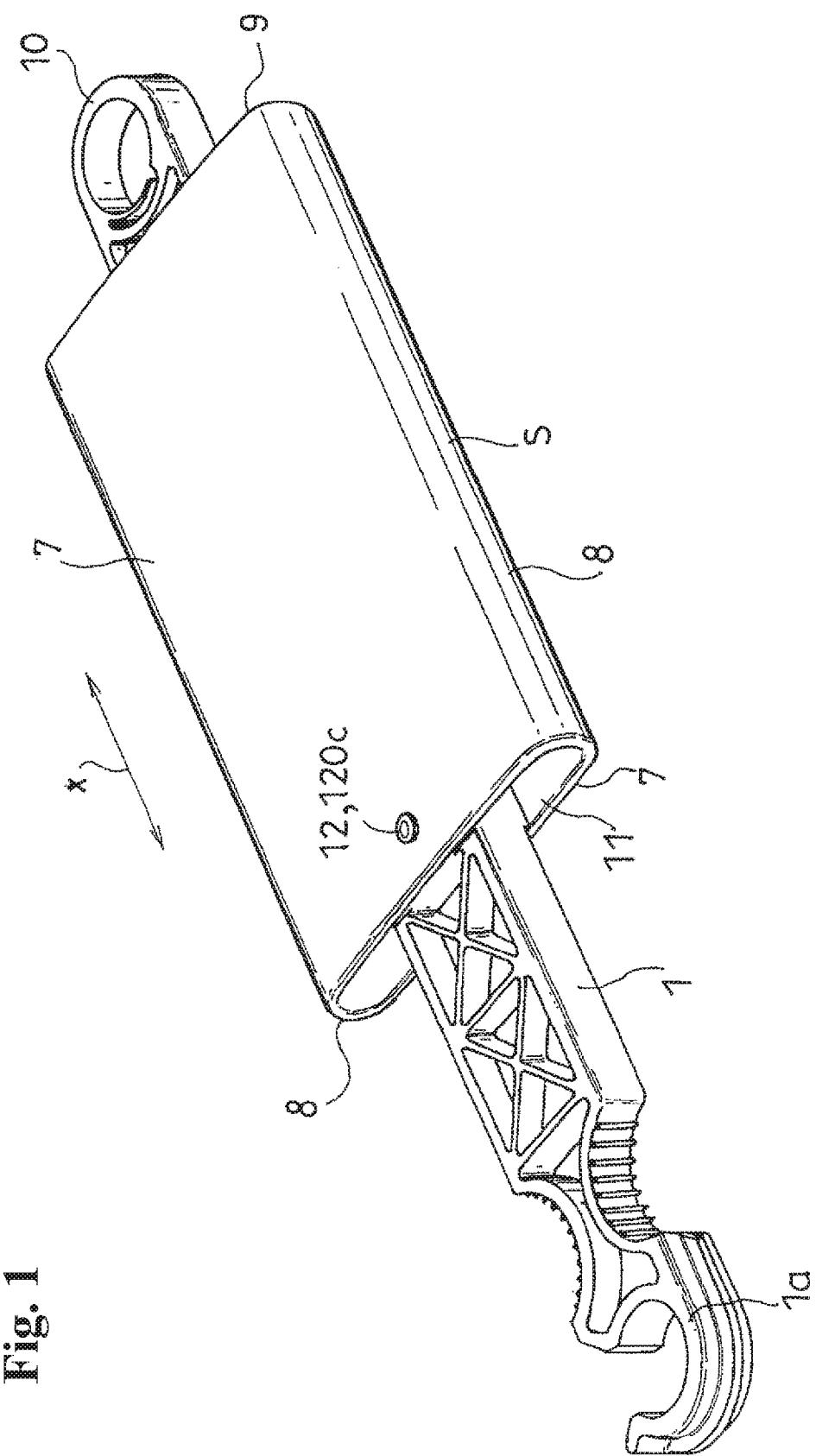
FIG. 1 is a perspective view of a damper (a first example) according to one embodiment of the present invention.

Hereinafter, based on FIG. 1 to FIG. 13, typical embodiments of the present invention will be explained. A damper according to the embodiments generates a braking force for a movement or relative movement of a piston P forming the damper. Typically, the damper is assembled with an article provided with a movable portion or the like (omitted in the drawings) which becomes an object to be braked, and used for applying the braking force relative to a movement of such object so as to move such object slowly and properly, with a feeling of a high quality, or prevent such braking object from moving extraordinarily.

Such damper comprises the piston P provided with a rod 1; and a cylinder S storing the piston P. Typically, such damper directly or indirectly links either one of the rod 1 or the cylinder S on the aforementioned braking object side, and directly or indirectly links the other of the rod 1 or the cylinder S on a side movably supporting such braking object so as to be assembled with the article provided with such braking object.

The cylinder S has a cylindrical shape opening at one end and closing at the other end. Although it is omitted in the drawings, the cylinder S may have a structure wherein one end of a cylindrical member wherein both ends are open is closed by a separate part. Such cylinder S has a flat cylindrical shape wherein a thickness thereof is made notably small. More specifically, such cylinder S comprises width-side wall portions 7 and thickness-side wall portions 8, and has a shape in a cross section in a direction orthogonal to a moving direction x of the piston P, i.e., the shape in the cross section orthogonal to a cylinder shaft thereof has substantially a flat rectangular shape.

The thickness-side wall portions 8 have a shape with a curvature wherein the outside of the cylinder S becomes the outside of the curvature.

Outside a blocking end 9 of the cylinder S, there is formed a bracket portion 10 for the aforementioned linking.

Also, such cylinder S includes a connection portion 12 bridging the width-side wall portions 7 on an open side thereof (see FIG. 4, FIG. 10, FIG. 12, and FIG. 13). Thereby, although the cylinder S has the flat cylindrical shape, at first, rigidity on the open side thereof can improve as much as possible, and secondly, a distance between a pair of the width-side wall portions 7 can be maintained constantly in such a way that the damper always exhibits an intended performance.

Figure 6:
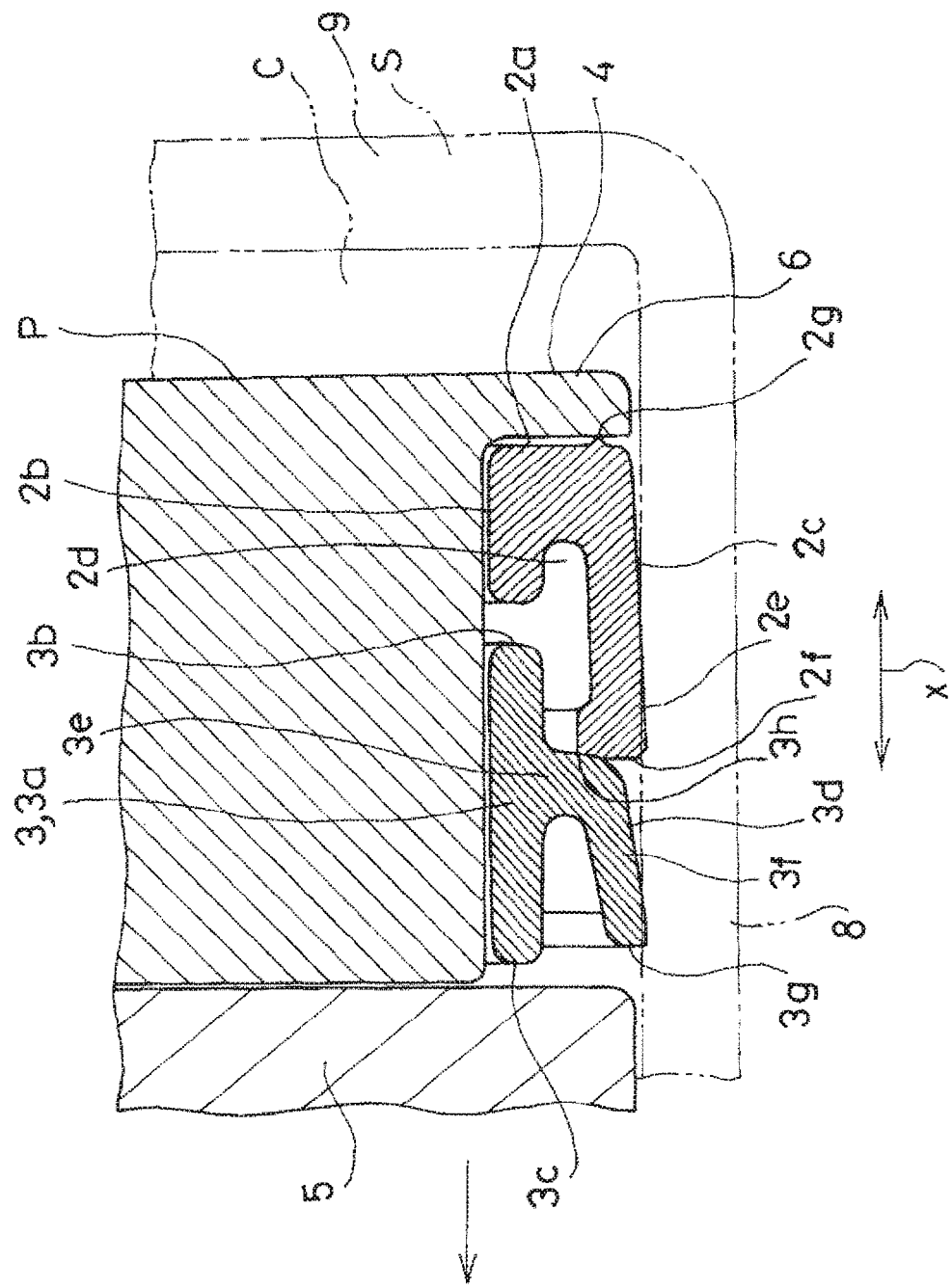
FIG. 6 is an enlarged cross-sectional structural view of the essential parts of the first example, and shows the state when the piston moves forward.
Figure 7:
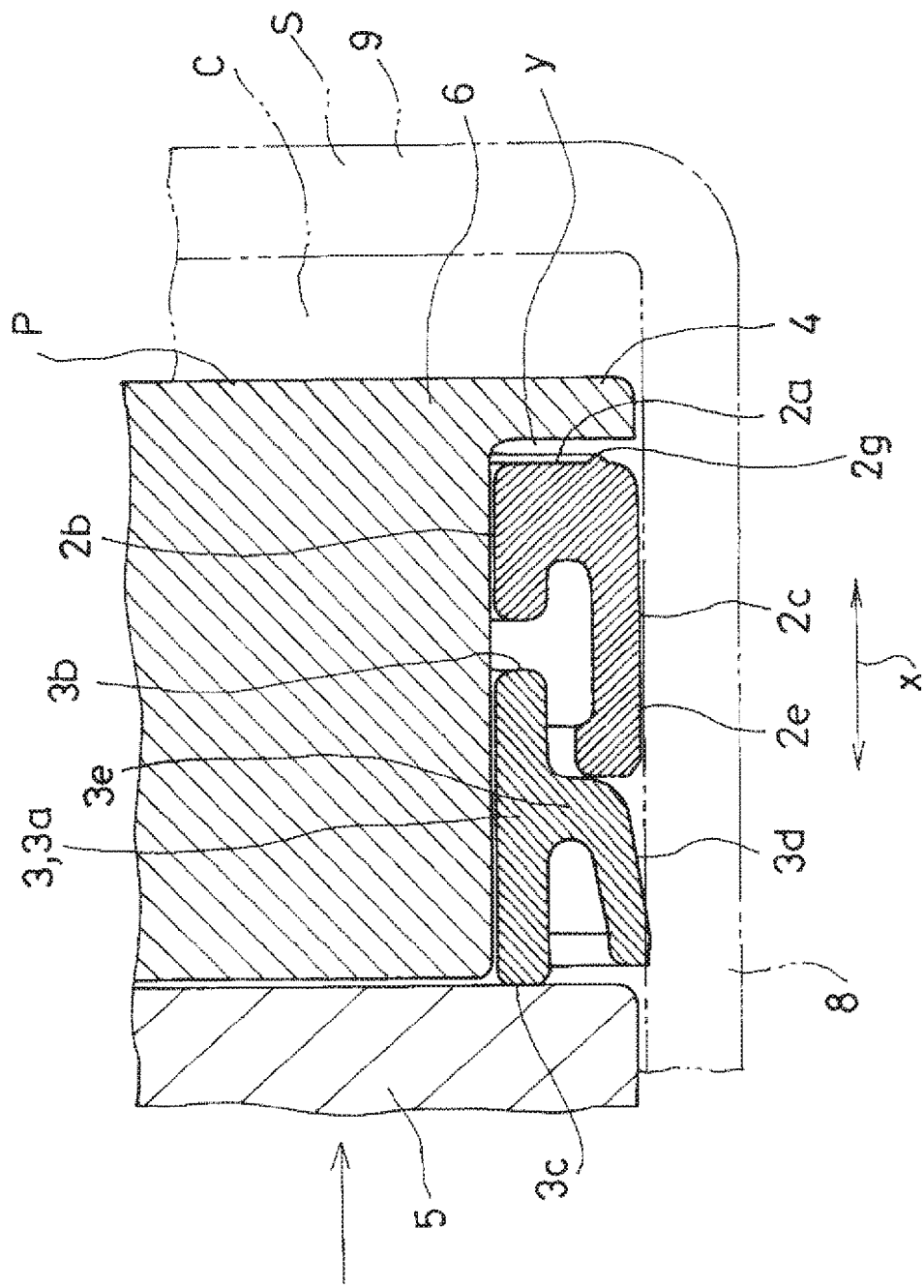
FIG. 7 is an enlarged cross-sectional structural view of the essential parts of the first example, and shows a state when the piston moves backward.
Figure 8:
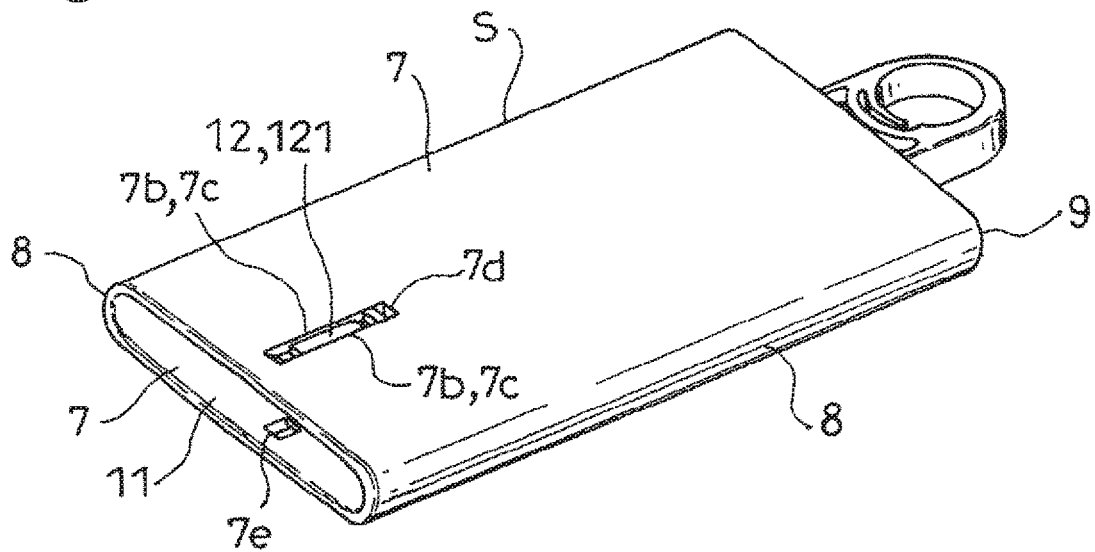
FIG. 8 is a perspective structural view of a cylinder forming the damper (a second example) according to one embodiment of the present invention.
Figure 9:
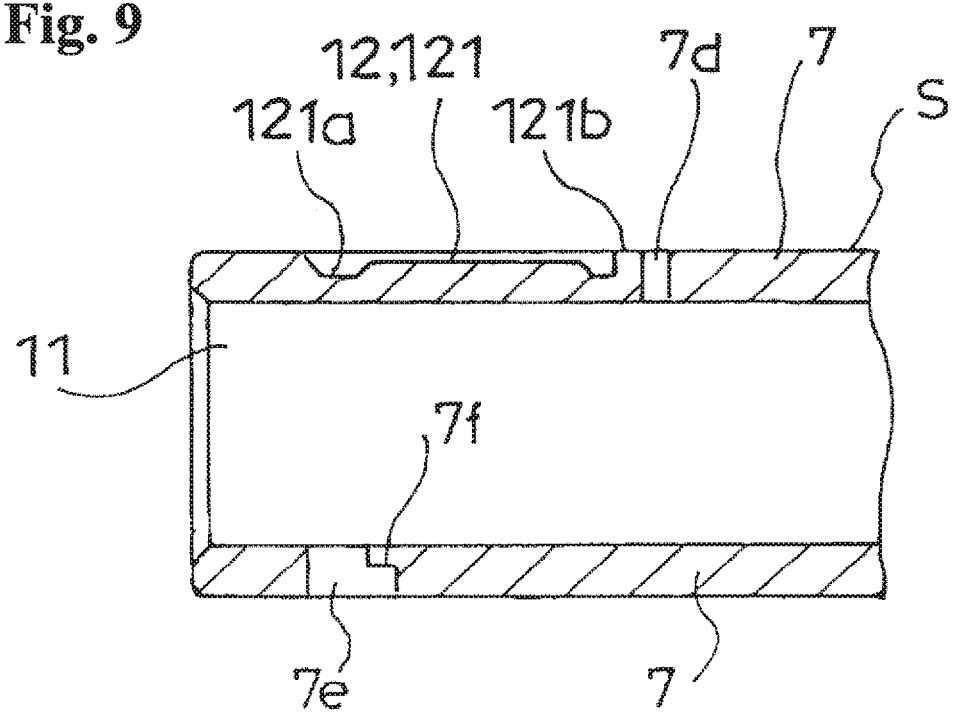
FIG. 9 is a cross-sectional view of essential parts of the cylinder forming the second example.
Figure 10:
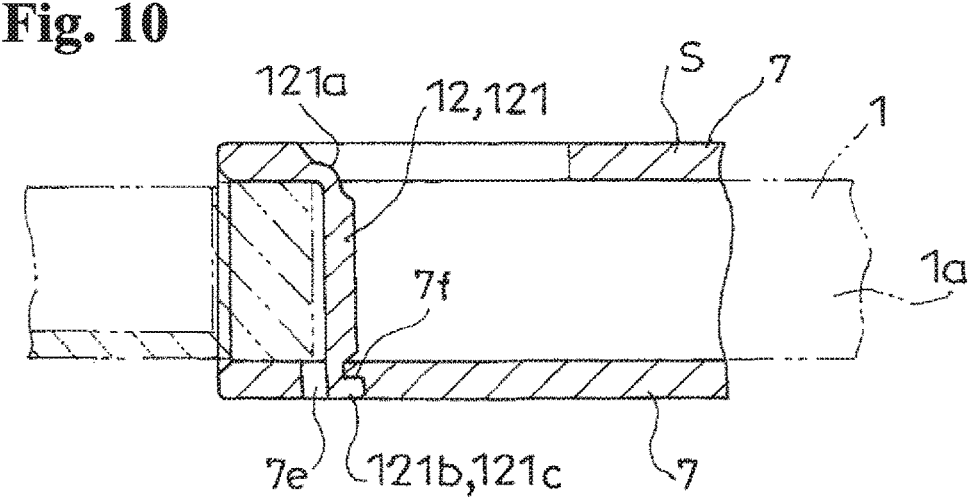
FIG. 10 is a cross-sectional view of essential parts of the second example.
Figure 11:
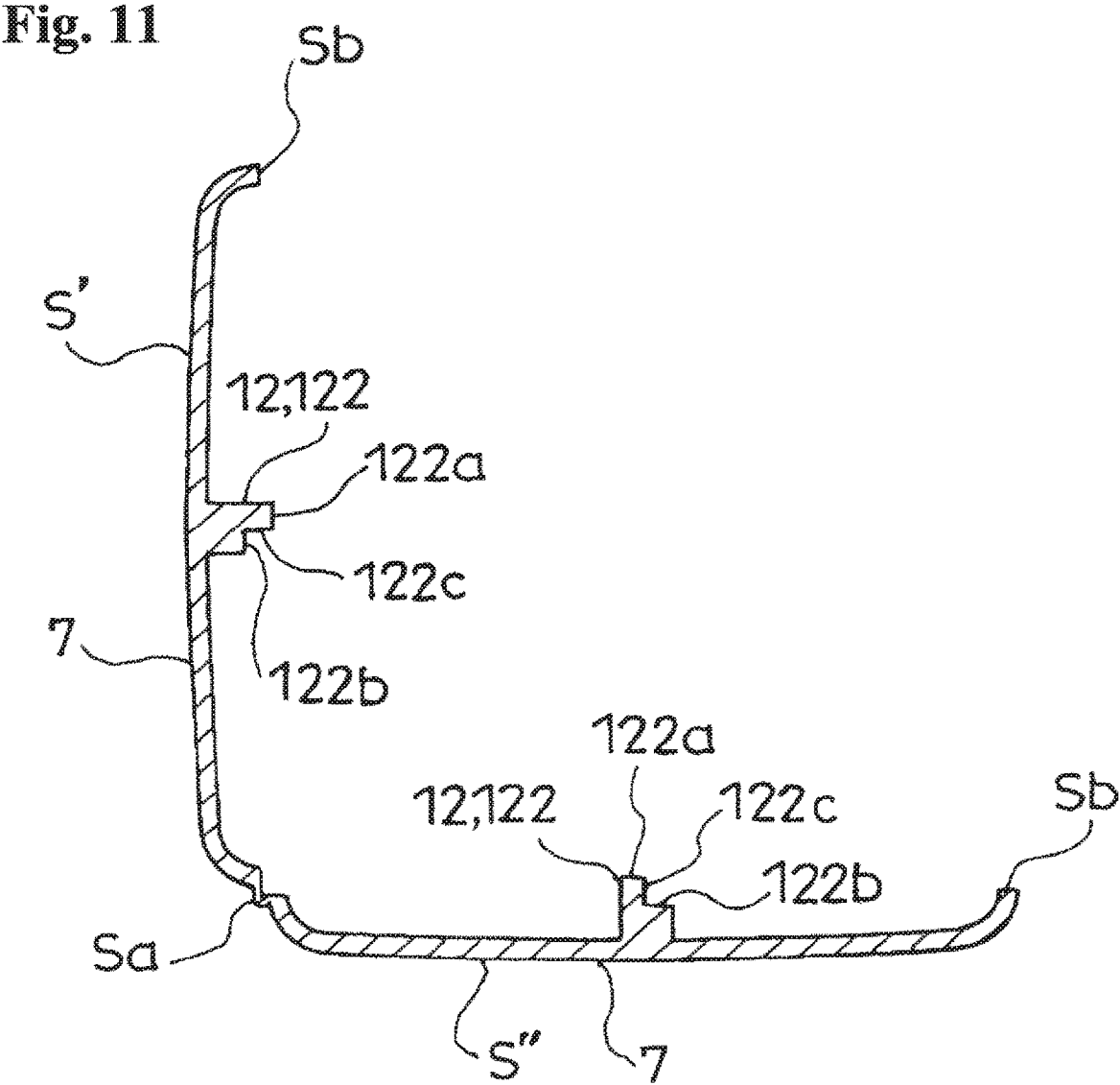
FIG. 11 is an end structural view of the cylinder forming the damper (a third example) according to one embodiment of the present invention, and shows a state before a first portion and a second portion forming the cylinder are combined.
Figure 12:
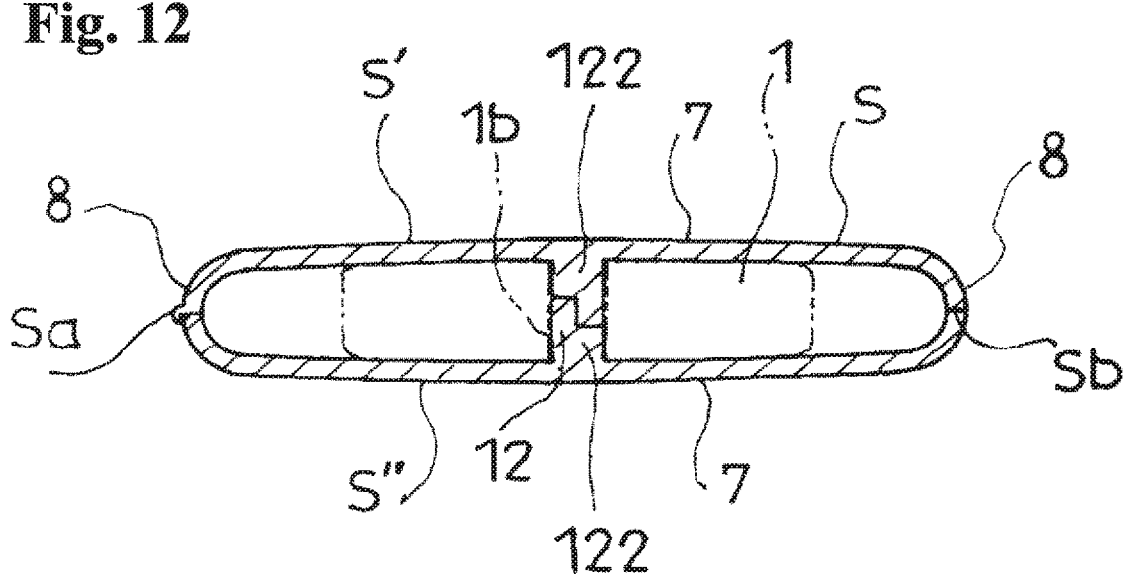
FIG. 12 is an end structural view of the third example.

In the first example shown in FIG. 1 to FIG. 7, a second example shown in FIG. 8 to FIG. 10, and a third example shown in FIG. 11 and FIG. 12, in the connection portion 12, a position approximately in a middle in a width direction of one of the width-side wall portions 7 and a position approximately in a middle in a width direction of the other of the width-side wall portions 7 are connected. Especially, in the first example, the second example, and the fourth example, the connection portion 12 has a restraining function for a deformation in a direction of increasing the distance between the pair of the width-side wall portions 7 and 7 of the cylinder S as well.

Figure 2:
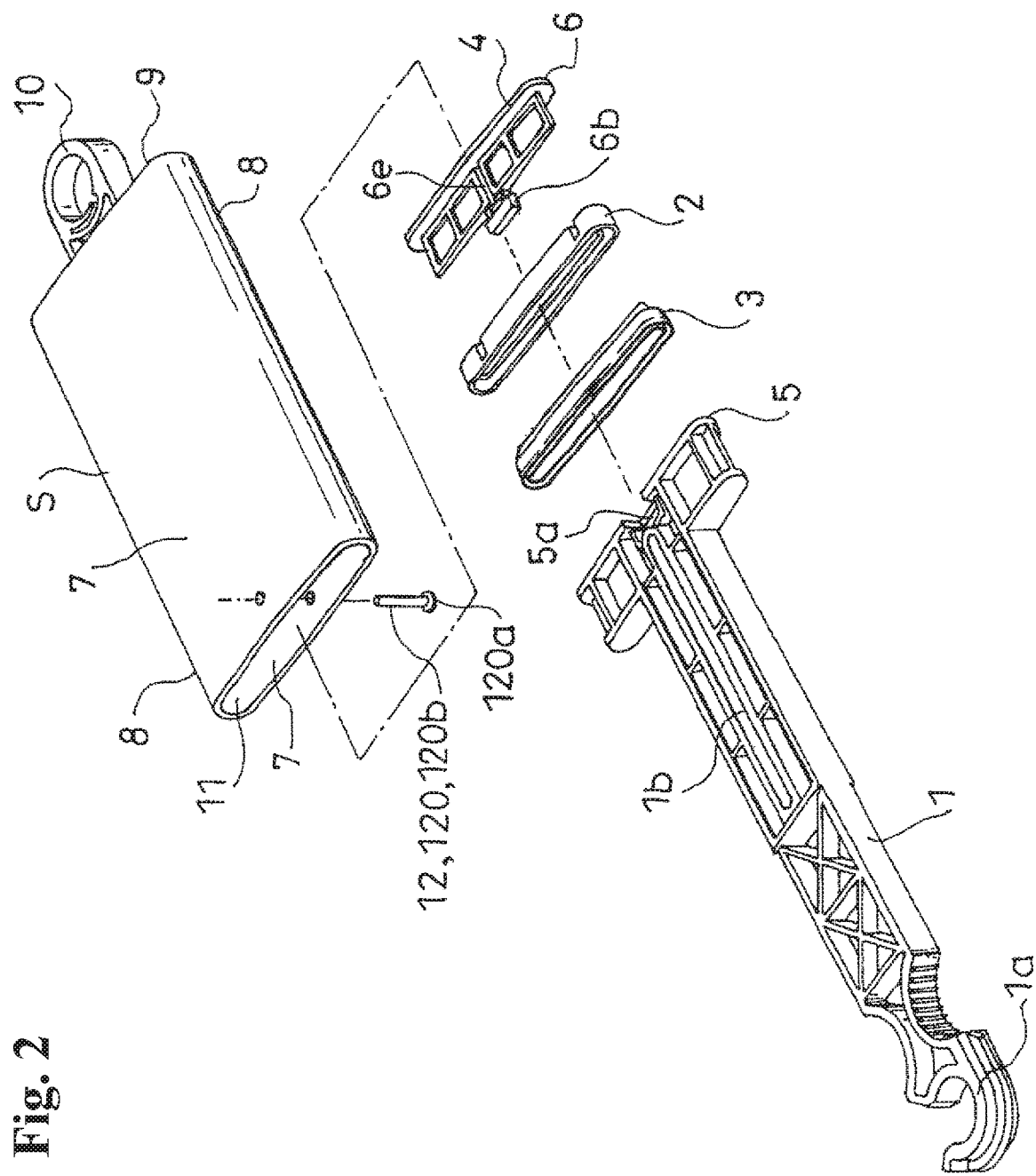
FIG. 2 is an exploded perspective view of the first example.
Figure 3:
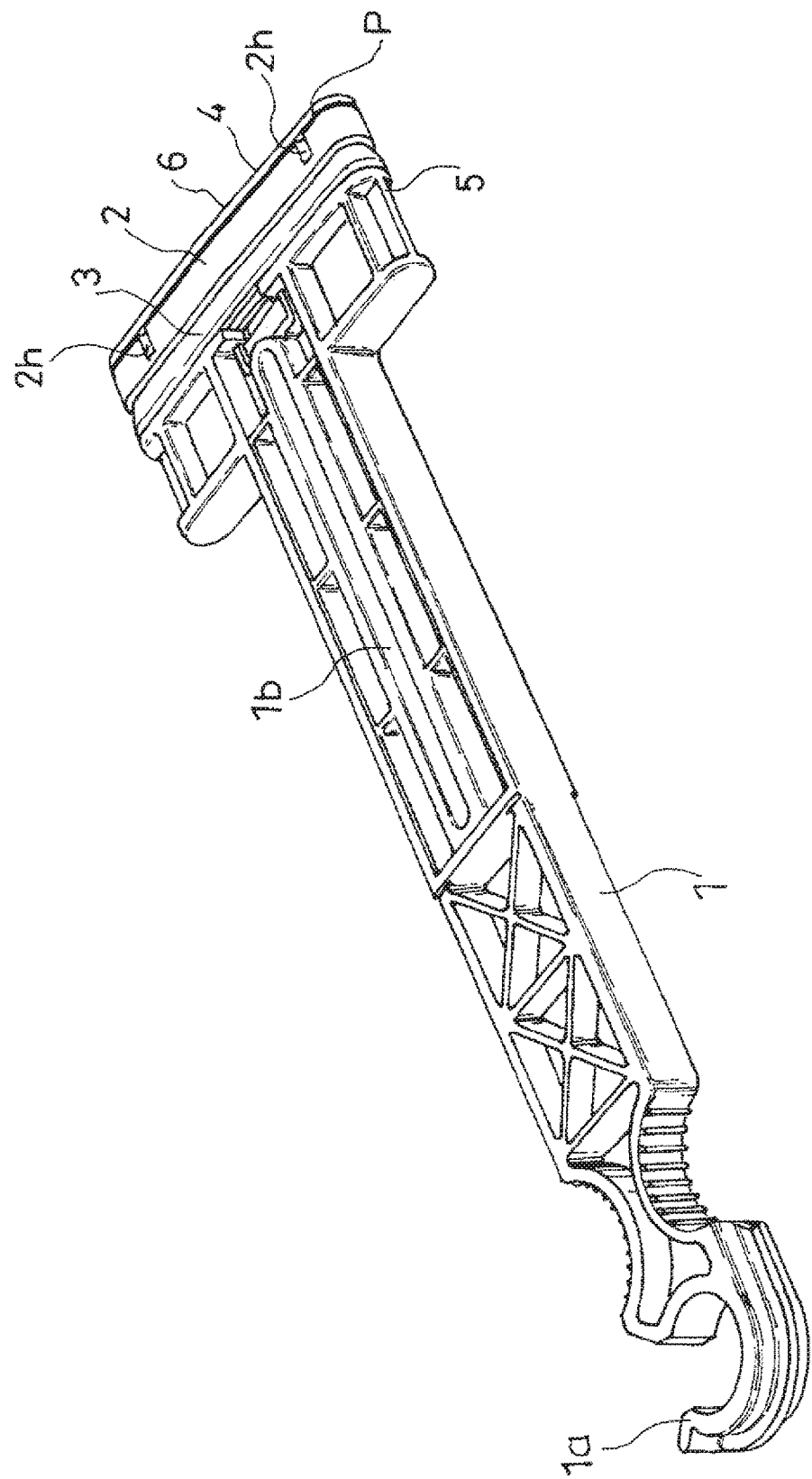
FIG. 3 is a perspective view of an assembly comprising a piston and a rod forming the first example.
Figure 4:
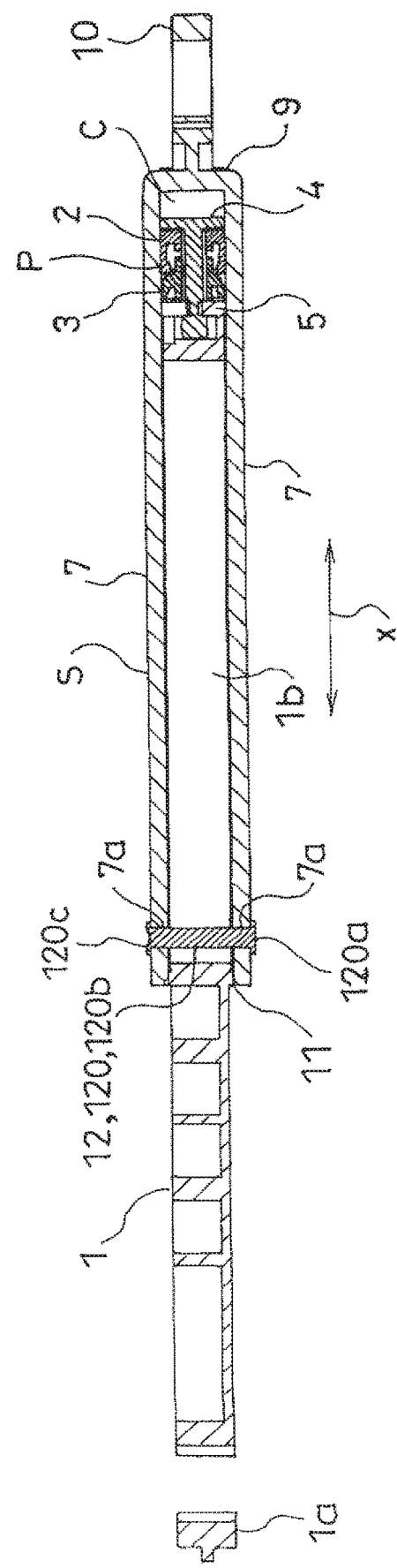
FIG. 4 is a cross-sectional structural view of the first example.

In the first example, the connection portion 12 is formed by a pin member 120 passing through through-holes 7a provided in the width-side wall portions 7, and formed with a press-fitting portion 120c at an end portion. In the first example, as shown in FIG. 2, the pin member 120 comprises a disk-shaped head portion 120a, and a columnar shaft portion 120b. As shown in FIG. 4, in the pair of the width-side wall portions 7 and 7, there are respectively formed the through-holes 7a with a size wherein although the shaft portion 120b can pass through, the head portion 120a cannot pass through. In the first example, as shown in FIG. 2, in the rod 1, there is formed a long hole 1b allowing a leg portion of the connection portion 12 formed as mentioned above to pass through along the moving direction x of the piston P. In the first example, in a condition where a piston P side of an assembly comprising the piston P and the rod 1 is at least stored inside the cylinder S, and the shaft portion 120b is passed through the through-holes 7a of the pair of the width-side wall portions 7 and 7 and the long hole 1b, an end portion of the shaft portion 120b projecting from the through-hole of the other of the width-side wall portions 7 is pre-fitted, so that there is formed the press-fitting portion 120c having a diameter larger than that of the through-hole 7a so as to form the connection portion 12 in the cylinder S.

In the second example, as shown in FIG. 9 and FIG. 10, the connection portion 12 is formed by one portion in the width-side wall portion 7 sectioned by division grooves 7b provided in one of the width-side wall portions 7, and is formed by a movable piece 121 provided with a bendable thin base portion 121a and a free end 121b which can engage an engaged portion 7e formed in the other of the width-side wall portions 7. The movable piece 121 is formed by one portion of one of the width-side wall portions 7 sectioned by a pair of long hole-shaped first through-holes 7c and 7c along the cylinder shaft of the cylinder S; and a second through-hole 7d bridging hole ends positioned on the blocking end 9 side in the pair of first through-holes 7c and 7c. There is formed a groove on an outer face of the width-side wall portion 7 between hole ends positioned on an open end 11 side of the cylinder S in the pair of first through-holes 7c and 7c. Thereby, in the movable piece 121, the open end 11 side of the cylinder S becomes the thin base portion 121a. The engaged portion 7e is formed by a through-hole which can receive the free end 121b of the movable piece 121 provided in the other of the width-side wall portions 7 at a position located directly under the thin base portion 121a of the movable piece 121. Even in the second example, in the rod 1, there is formed the long hole 1b allowing the movable piece 121 of the connection portion 12 formed as mentioned above to pass through along the moving direction x of the piston P. In the second example, in the state where at least the piston P side of the assembly comprising the piston P and the rod 1 is stored inside the cylinder S, when the movable piece 121 is operated to be pushed in toward the inside of the cylinder S while elastically deforming the thin base portion 121*a*, the free end 121*b* of the movable piece 121 enters into the engaged portion 7*e* while slightly elastically deforming a terminal 121*c* thereof, and by a subsequent elastic return, the free end 121*b* engages a step portion 7*f* on an entrance side of the engaged portion 7*e*, thereby forming the connection portion 12 in the cylinder S.

Also, in the third example, the cylinder S is formed by assembling a first portion S' including one of the width-side wall portions 7, and a second portion S" including the other of the width-side wall portions 7. In the third example, the cylinder S is divided into the first portion S' and the second portion S" at a position approximately in a middle in a thickness direction of the thickness-side wall portion 8. The first portion S' and the second portion S" are connected through a thin portion Sa formed in one of the thickness-side wall portions 8, and while elastically deforming the thin portion Sa, when the first portion S' and the second portion S" are bound together in such a way that the width-side wall portion 7 of the first portion S' and the width-side wall portion 7 of the second portion S" become parallel, the first portion S' and the second portion S" abut against each other on a side opposite to the thin portion Sa so as to form the other of the thickness-side wall portions 8. In a portion Sb wherein the first portion S' and the second portion S" abut against each other, the first portion S' and the second portion S" are welded in an airtight state. Then, in the third example, in the first portion S' and the second portion S", there are respectively formed projection portions 122 which become the connection portion 12 by being abutted against each other by the aforementioned combination. The projection portions 122 of the first portion S' and the second portion S" respectively form a step shape having an upper step 122*a* which becomes a tip thereof; a lower step 122*b*; and a step 122*c* between both the upper step 122*a* and the lower step 122*b*, and by the aforementioned connection, the upper step 122*a* of the first portion S' contacts the lower step 122*b* of the second portion S", and the lower step 122*b* of the first portion S' contacts the upper step 122*a* of the second portion S" so as to form the columnar connection portion 12. Even in the third example, in the rod 1, there is formed the long hole 1*b* allowing the connection portion 12 formed as mentioned above to pass through along the moving direction x of the piston P (see FIG. 12). In the third example, the aforementioned connection is carried out in such a way so as to store at least the piston P side of the assembly comprising the piston P and the rod 1 is stored inside the cylinder S, and to allow the projection portions 122 to pass through the long hole 1*b*, thereby, forming the connection portion 12 in the cylinder S.

In the first example to the third example, by the connection portion 12, a combined state between the cylinder S and the piston P side can be maintained, and a movement on the piston P side is guided.

Figure 13:
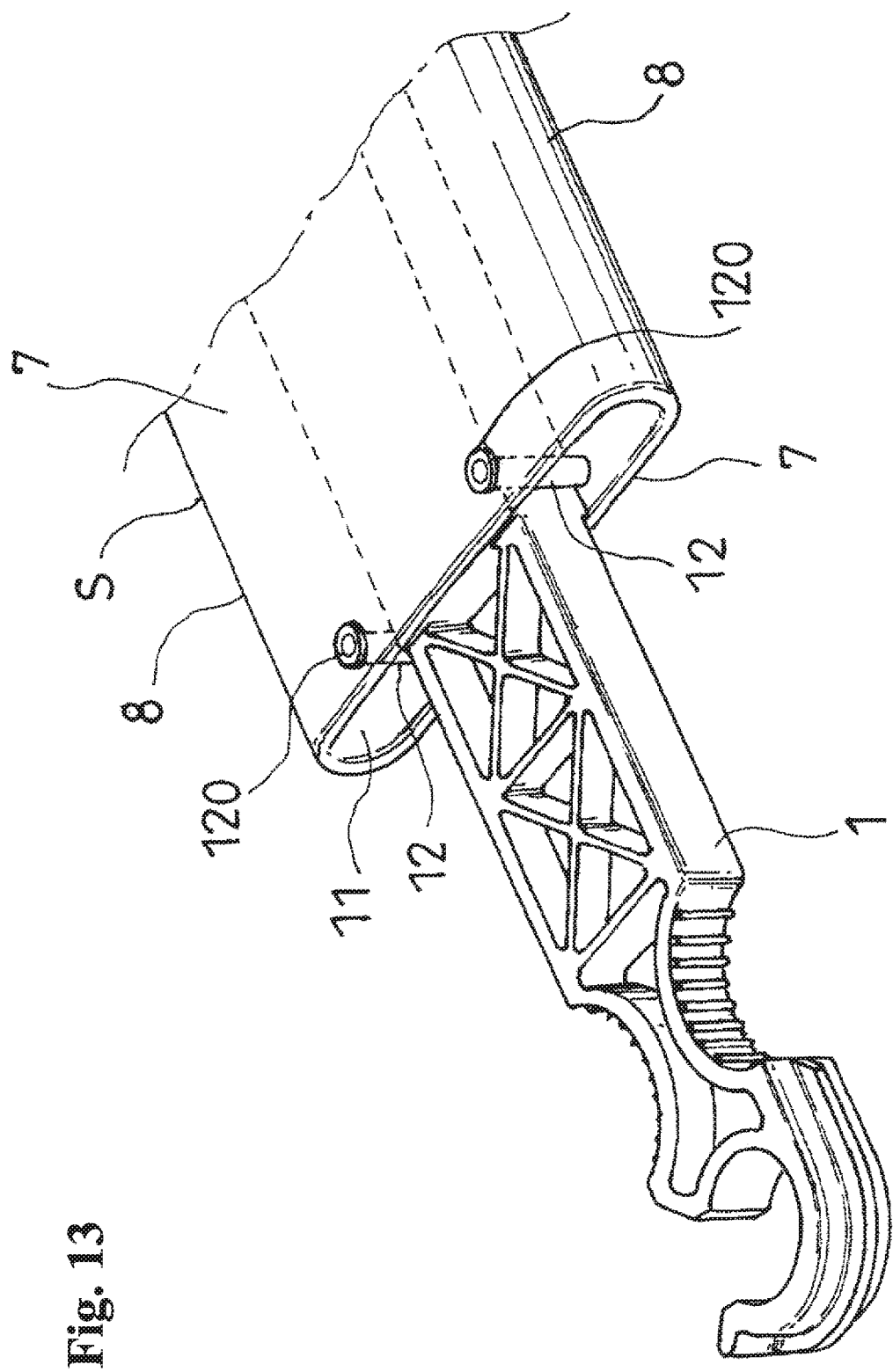
FIG. 13 is a perspective structural view of essential parts of the cylinder forming the damper (a fourth example) according to one embodiment of the present invention.

On the other hand, in the fourth example shown in FIG. 13, two connection portions 12 are provided, and the two connection portions 12 and 12 sandwich the rod 1. In the fourth example, regarding the connection portion 12, the connection portions 12 are respectively provided on both sides sandwiching a position approximately in a middle in a width direction of the cylinder S. Then, a distance between the two connection portions 12 is set to be substantially the same as a width size of the rod 1 and to become smaller than a size in a direction orthogonal to the moving direction x of the later-described piston P. In an illustrated example, the connection portions 12 of the fourth example are formed by pin members 120 same as the connection portion 12 of the first example. In the fourth example, by such two connection portions 12 and 12, at first, the rigidity on the open side of the cylinder S can be improved further, secondly, the distance between the pair of the width-side wall portions 7 and 7 can be constantly maintained more firmly in such a way that the damper always exhibits the intended performance, and thirdly, the connection portions 12 can maintain the assembled state between the cylinder S and the piston P side, and can guide the movement on the piston P side. In the fourth example, in the rod 1, the long hole 1*b* in the first example to the third example is not necessary. Incidentally, although it is omitted in the drawings, the connection portion 12 can be provided only on one side sandwiching the position approximately in the middle in the width direction of the cylinder S to maintain the assembled state of the piston P by one connection portion 12 as well.

Incidentally, a structure of the assembly comprising the rod 1 and the piston P of the second example to the fourth example is the same or substantially the same as that of the first example, so that in the following, based on FIG. 1 to FIG. 7 showing the first example, the structure will be explained.

The rod 1 has a rod shape long in the moving direction of the piston P. On an outer end positioned outside the cylinder S in the rod 1, there is formed a bracket portion 1*a* for the aforementioned linking.

Also, the rod 1 comprises the long hole 1*b* allowing the connection portion 12 to pass through along the moving direction (see FIG. 2). Also, in the embodiments, one end of the long hole 1*b* is formed with the piston P. Specifically, in the embodiments, one of closed hole ends of the long hole 1*b* always positioned inside the cylinder S which becomes one end of the long hole 1*b* is positioned inside the later-described second flange 5 forming one portion of the piston P. Thereby, in the embodiments, such long hole 1*b* prevents the piston P from coming off from the cylinder S so as to smoothly carry out the movement on the piston P side, and maximize a movement distance of the piston P inside the cylinder S.

As shown in FIG. 2, the piston P is provided with a seal member 2 relative to an inner wall of the cylinder S; and a slider 3 provided slidably relative to the piston P, and contacting the inner wall of the cylinder S with a predetermined frictional force.

In the illustrated examples, as shown in FIG. 2, the piston P is provided with a first flange 4 facing the blocking end 9 of the cylinder S; and a second flange 5 retaining the seal member 2 and the slider 3 between the second flange 5 and the first flange 4. The second flange 5 is positioned at a back side of the first flange 4, i.e. on the open end 11 side of the cylinder S. In both the first flange 4 and the second flange 5, an outer frame shape in a cross section in the moving direction x of the piston P, i.e. in a direction orthogonally in a direction along the cylinder shaft of the cylinder S, has a shape which becomes a complementary shape to an inner frame shape in the cross section of the cylinder S in the same direction. Thereby, the piston P is guided by the inner wall of the cylinder S so as to reciprocate in the direction along the cylinder shaft of the cylinder S.

More specifically, as shown in FIG. 2, the second flange 5 is formed in an inner end of the rod 1. The first flange 4 is formed in a head part 6 which is a separate member from the rod 1. The head part 6 includes a plate-like trunk portion 6*a* shown in FIG. 5 and facing a plate face to the width-side wall portions 7 of the cylinder S. On a side facing the blocking end 9 of the cylinder S in the trunk portion 6a, there is integrally formed the first flange 4 positioning a flange end outwardly more than an outer face of the trunk portion 6a at each position around the trunk portion 6a. Also, in a portion which is an end portion facing the open end 11 of the cylinder S in the trunk portion 6a, and positioned on the cylinder shaft of such cylinder S, there is formed a male joint portion 6b formed by a head portion 6c and a neck portion 6d, and integrated with the trunk portion 6a through the neck portion 6d. In a portion positioned on the cylinder shaft of the cylinder S in the second flange 5, there is formed a female joint portion 5a shown in FIG. 2 and formed by a first concave portion 5b receiving and retaining the head portion 6c of the male joint portion 6b; and a second concave portion 5c receiving and retaining the neck portion 6c of the male joint portion 6b, and opening outwardly at an end portion facing the blocking end 9 of the cylinder S in the second flange 5. In the embodiments, from a state wherein the seal member 2 and the slider 3 respectively having a flat ring shape are combined with the head part 6 in such a way as to surround the trunk portion 6a of the head part 6, the male joint portion 6b of the head part 6 is fitted into the female joint portion 5a of the second flange 5 so as to form the piston P formed by retaining the seal member 2 and the slider 3 between such first flange 4 and second flange 5.

As shown in FIG. 2, typically, the seal member 2 is formed by rubber or plastic having a rubber-like elasticity, and has the flat ring shape. The trunk portion 6a of the head part 6 is inserted to pass through the inside of the seal member 2 from a side of the male joint portion 6b so that such head part 6 and seal member 2 are combined. In the illustrated examples, as shown in FIG. 6, the seal member 2 includes a front end face 2a relative to the first flange 4; an inner face portion 2b relative to an outer face of the head part 6; and an outer face portion 2c relative to the inner wall of the cylinder S. Also, on a side facing the open end 11 side of the cylinder S in the seal member 2, there is formed a circumferential groove 2d between the inner face portion 2b and the outer face portion 2c. An outer face side sandwiching the circumferential groove 2d extends toward the open end 11 side of the cylinder S throughout all circumferential directions of the seal member 2, so that the seal member 2 is provided with a skirt-shaped portion 2e, and the outer face portion 2c of the seal member 2 increases a size more than the inner face portion 2b in the moving direction x of the piston P. The outer face portion 2c of the seal member 2 inclines in a direction of gradually increasing a thickness of the seal member 2 as moving from the front end face 2a to a terminal 2f of the skirt-shaped portion 2e. Also, on the front end face 2a of the seal member 2, there is formed a circumferential projection piece 2g.

Typically, the slider 3 is formed by the plastic, and has the flat ring shape as shown in FIG. 2. As mentioned above, in a state wherein the head part 6 and the seal member 2 are combined, the trunk portion 6a of the head part 6 is inserted to pass through the inside of the slider 3 from the side of the male joint portion 6b, so that such head part 6 and slider 3 are combined. In the illustrated examples, as shown in FIG. 6, the slider 3 is provided with a short cylindrical base 3a wherein an inner frame shape in a cross section orthogonally in the moving direction x of the piston P has a shape which becomes complementary to an outer frame shape in a cross section of the trunk portion 6a of the head part 6 in the same direction; and a lip 3d integrally formed outside the base 3a. In the illustrated examples, the lip 3d has a circumferential fin-like member formed in such a way as to surround the base 3a. The lip 3d has a base portion 3e integrated with an outer face portion of the base 3a between a front end 3b positioned on a seal member 2 side and a back end 3c positioned on the open end 11 side of the cylinder S in the base 3a, and is provided with an extension portion 3f extending toward the open end 11 side of the cylinder S from the base portion 3e. A shoulder portion 3h is formed between the base portion 3e and the extension portion 3f. The extension portion 3f has an inclination gradually increasing a distance between the extension portion 3f and the base 3a as moving to a terminal 3g thereof from the shoulder portion 3h.

The seal member 2 and the slider 3 are held between the first flange 4 and the second flange 5 in a state allowing a slight movement along the moving direction x of the piston P. The outer face portion 2c of the seal member 2 contacts the inner wall of the cylinder S throughout a whole circumference thereof, and the extension portion 3f of the slider 3 contacts the inner wall of the cylinder S on a terminal 3g side thereof throughout a whole circumference thereof as well. Also, a portion located between the front end 3b of the base 3a of the slider 3 and the base portion 3e of the lip 3d is positioned inside the skirt-shaped portion 2e of the seal member 2, and the shoulder portion 3h of the lip 3d of the slider 3 faces the terminal 2f of the skirt-shaped portion 2e of the seal member 2 (see FIG. 4 to FIG. 6).

Then, in the embodiments, when the braking force is generated, the slider 3 presses the seal member 2, and a portion contacting the inner wall of the cylinder S in the seal member 2 deforms outwardly toward the cylinder S.

Figure 5:
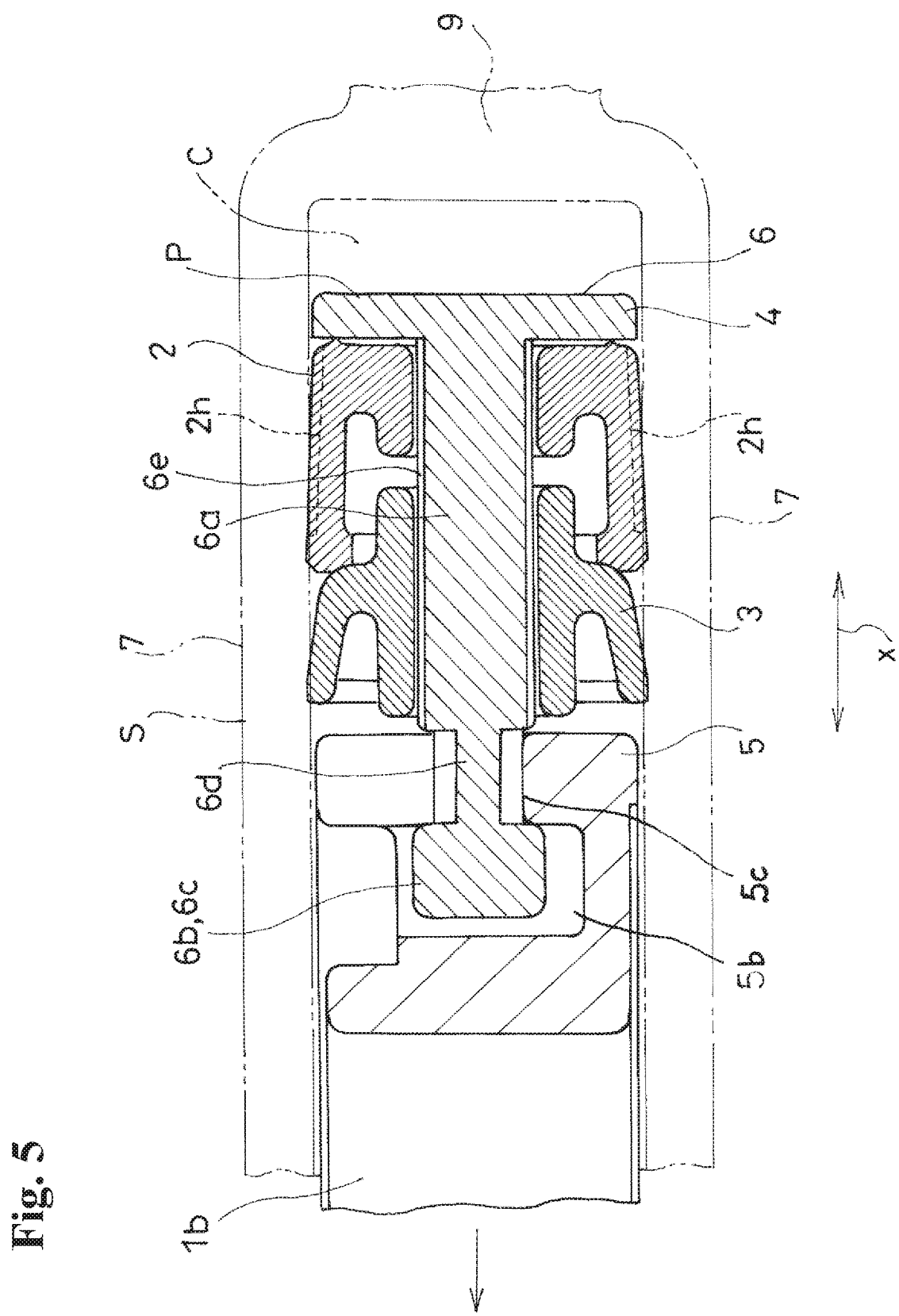
FIG. 5 is an enlarged cross-sectional structural view of essential parts of the first example, and shows a state when the piston moves forward.

In the illustrated examples, when the piston P moves forward in a direction of separating from the blocking end 9 of the cylinder S, a chamber C formed between the piston P and the blocking end 9 comes to have a negative pressure, thereby generating a resistance due to a pressure change which becomes one portion of the braking force (see FIG. 4 and FIG. 5). Also, at that time, the slider 3 deforms the seal member 2 as mentioned above to increase a frictional force between the seal member 2 and the cylinder S, thereby generating a frictional resistance which becomes one portion of the braking force (see FIG. 4 and FIG. 5).

In the illustrated examples, when the piston P moves forward, the slider 3 becomes difficult to move in the forward-moving direction due to a shape of the lip 3d, so that the shoulder portion 3h of the slider 3 is pressed against the terminal 2f of the skirt-shaped portion 2e of the seal member 2, and the circumferential projection piece 2g formed in the front end face 2a of the seal member 2 is firmly attached to the first flange 4 so as to seal between the front end face 2a and the first flange 4, and the skirt-shaped portion 2e deforms outwardly so as to seal between the outer face portion 2c of the seal member 2 and the inner wall of the cylinder S (see FIG. 4 and FIG. 5). Thereby, in the illustrated examples, when the piston P moves forward, ventilation relative to the chamber C is limited to a vent passage formed by a groove 6e (see FIG. 2 and FIG. 5) formed throughout the end portion facing the open end 11 of the cylinder S in the trunk portion 6a from an edge portion of the first flange 4 in a portion positioned on the cylinder shaft of the cylinder S in the head part 6 forming the piston P so as to generate the resistance due to the aforementioned pressure change. Also, the skirt-shaped portion 2e of the seal member 2 deforms outwardly as described above so as to generate the aforementioned frictional resistance. Namely, the slider 3 is provided with a pressure contact portion pressed against the seal member 2 from the rod 1 side, and in the illustrated examples, the shoulder portion 3h functions as the pressure contact portion.

In the embodiments, in accordance with an operation speed of the piston P, a deformation amount of the seal member increases. Therefore, the damper according to the embodiments is a damper with a speed response type changing the braking force in accordance with a moving speed of the braking object which becomes the braking object, or a load response type.

In the damper according to the embodiments, the braking force is formed by the resistance due to the pressure change and the frictional resistance so as to properly control the movement of the braking object in the whole process thereof. Namely, the damper according to the embodiments can prevent the situations wherein the braking object halts in a moving process, and moreover, starts to unexpectedly move backward toward the position before the movement from a middle of the movement as little as possible. Also, the damper according to the embodiments can easily generate an intended braking force even if a cross-sectional area of the cylinder S is made small so as to have a characteristic which can easily reduce a size and thickness.

On the other hand, in the illustrated examples, when the piston P moves backward in a direction of approaching the blocking end 9 of the cylinder S, the chamber C is difficult to have a positive pressure, and at that time, the aforementioned frictional resistance becomes small as well (FIG. 7). In the illustrated examples, when the piston P moves backward, the seal member 2 and the slider 3 move to a second flange 5 side to form a gap y between the first flange 4 and the front end face 2a of the seal member 2, and due to the shape of the lip 3d, the slider 3 can easily move in a backward-moving direction of the piston P, so that the slider 3 is not pressed against the seal member 2, and the frictional resistance between the seal member 2 and the inner wall of the cylinder S does not increase as well. In addition to the vent passage formed by the groove 6e, the chamber C is communicated through the gap y between the first flange 4 and the front end face 2a of the seal member 2 as well. Also, in the illustrated examples, as shown in FIG. 5, on the outer face of the seal member 2, there is formed a groove 2h along the moving direction x of the piston P, and the groove 2h opens a groove end on a chamber C side, and closes a groove end on the open end 11 side of the cylinder S; however, when the piston P moves backward, due to a pressure increase on the chamber C side, at a position forming the groove 2h, one portion of the seal member 2 deforms inwardly, and exhaust ventilation can be carried out from the chamber C through the groove 2h as well. Thereby, in the illustrated examples, when the piston P moves backward, the damper is made so as not to generate a special braking force.

Incidentally, obviously, the present invention is not limited to the embodiments explained above, and the embodiments include all embodiments which can obtain the object of the present invention.

EXPLANATION OF SYMBOLS

P a piston P
H a housing
1 a rod 1
7 width-side wall portions
8 thickness-side wall portions
x a moving direction
12 a connection portion Incidentally, all contents of the specification, claims, drawings, and abstract of Japanese Patent Application No. 2015-100391 filed on May 15, 2015 are cited in their entireties herein and are incorporated as a disclosure of the specification of the present invention.

What is claimed is:

1. A damper comprising:
   a piston provided with a rod at one end thereof, the rod having an elongated hole therein extending along a moving direction of the piston,
   a cylinder storing the piston, and generating a braking force by a movement or relative movement of the piston, the cylinder having an opening at one side, a closed end at a side opposite to the opening, width-side wall portions and thickness-side wall portions connecting the width-side wall portion to have substantially a flat rectangular shape in a cross section, the piston with the rod moving in a direction parallel to the width-side wall portions and the thickness-side wall portions, and
   a connection portion bridging the width-side wall portions, the connection portion being formed adjacent the opening and passing through the elongated hole of the rod to cross the opening so that the rod extends outwardly from the cylinder through the opening, the connecting portion extending perpendicular to the width-side wall portions at a position away from the thickness-side wall portions to connect the width-side wall portions.

2. The damper according to claim 1, wherein one end of the elongated hole is formed with the piston.

3. The damper according to claim 1, wherein the connection portion connects the cylinder approximately in a middle in a width direction of one of the width-side wall portions and the cylinder approximately in a middle in a width direction of another of the width-side wall portions.

4. The damper according to claim 1, wherein the connection portion is formed by a pin member passing through through-holes provided in the width-side wall portions, and formed with press-fitting portions at end portions.

5. The damper according to claim 1, wherein the connection portion is one portion of the width-side wall portion sectioned by a division groove provided in one of the width-side wall portions, and includes a movable piece provided with a bendable thin base portion and a free end engageable with an engaged portion formed in another of the width-side wall portions.

6. The damper according to claim 1, wherein the cylinder is formed by combining a first portion including one of the width-side wall portions and a second portion including another of the width-side wall portions, and projection portions which become the connection portion by abutting against each other by combination thereof are formed respectively in the first portion and the second portion.

7. The damper according to claim 1, wherein the connection portion is a pin extending between the width-side wall portions and passing through the elongated hole of the rod.

8. The damper according to claim 1, wherein the open side is surrounded and defined by the width-side wall portions and the thickness-side wall portions to form the opening, the connecting portion directly connecting the width-side wall portions at the opening.

9. The damper according to claim 8, wherein the cylinder includes a blocking end at one side and the opening at a side opposite to the blocking end so that the rod extends outwardly from the cylinder through the opening.

10. The damper according to claim 9, wherein the piston has a width extending along the width-side wall portion, which is greater than a width of the rod.

11. A damper consisting essentially of:
- a piston provided with a rod at one end thereof, the rod having an elongated hole therein extending along a moving direction of the piston,
- a cylinder storing the piston, and generating a braking force by a movement or relative movement of the piston, the cylinder having an opening at one side, a closed end at a side opposite to the opening, width-side wall portions and thickness-side wall portions connecting the width-side wall portion to have substantially a rectangular shape in a cross section, the piston moving in a direction parallel to the width-side wall portions and the thickness-side wall portions, and
- a connection portion bridging the width-side wall portions, the connection portion being formed adjacent the opening and passing through the elongated hole of the rod to cross the opening so that the rod extends outwardly from the cylinder through the opening, the connecting portion extending perpendicular to the width-side wall portions at a position away from the thickness-side wall portions to connect the width-side wall portions.

* * * * *